US011444930B2

(12) United States Patent
Okumura

(10) Patent No.: US 11,444,930 B2
(45) Date of Patent: Sep. 13, 2022

(54) COMPUTER-READABLE MEDIUM, INFORMATION PROCESSING DEVICE, AND METHOD FOR PROVIDING BETTER ACCESSIBILITY TO CLOUD SERVER

(71) Applicant: BROTHER KOGYO KABUSHIKI KAISHA, Nagoya (JP)

(72) Inventor: Fumio Okumura, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 170 days.

(21) Appl. No.: 16/749,206

(22) Filed: Jan. 22, 2020

(65) Prior Publication Data
US 2020/0287882 A1 Sep. 10, 2020

(30) Foreign Application Priority Data
Mar. 5, 2019 (JP) .............................. JP2019-039747

(51) Int. Cl.
*H04L 9/40* (2022.01)
*G06F 9/48* (2006.01)

(52) U.S. Cl.
CPC ............ *H04L 63/08* (2013.01); *G06F 9/4881* (2013.01)

(58) Field of Classification Search
CPC ......... H04L 63/08; G06F 9/4881; G06F 21/44
See application file for complete search history.

(56) References Cited

U.S. PATENT DOCUMENTS

| | | | | |
|---|---|---|---|---|
| 6,307,837 B1* | 10/2001 | Ichikawa | ............ | H04L 63/0236 370/230 |
| 6,584,505 B1* | 6/2003 | Howard | ................ | H04L 63/168 709/227 |
| 7,194,761 B1* | 3/2007 | Champagne | ............ | H04L 63/08 713/168 |
| 7,395,430 B2* | 7/2008 | Gupta | .................... | H04L 63/04 713/173 |

(Continued)

FOREIGN PATENT DOCUMENTS

JP 2014-045461 A 3/2014

OTHER PUBLICATIONS

Official Action dated Mar. 28, 2022 in a related application, namely, U.S. Appl. No. 16/750,065, filed Jan. 23, 2020.

*Primary Examiner* — Aravind K Moorthy
(74) *Attorney, Agent, or Firm* — Scully, Scott, Murphy & Presser, PC

(57) ABSTRACT

A non-transitory computer-readable medium stores computer-readable instructions executable by a processor of an information processing device communicably connected with an image processing apparatus and a cloud server. The computer-readable instructions realize an application configured to, when executed by the processor, cause the processor to, when receiving a workflow storing instruction to store a workflow, select one of a plurality of methods to obtain authentication information for accessing the cloud server set for the workflow to be stored, the workflow being a sequence of processes using the image processing apparatus and the cloud server, and when receiving a workflow execution instruction to perform the workflow, access the cloud server by using the authentication information obtained in the selected method.

14 Claims, 11 Drawing Sheets

(56) References Cited

U.S. PATENT DOCUMENTS

| | | | |
|---|---|---|---|
| 8,528,071 B1* | 9/2013 | Kwan | H04L 63/0876 726/14 |
| 9,319,549 B2 | 4/2016 | Kimura | |
| 9,667,611 B1* | 5/2017 | Friedman | G06F 21/32 |
| 9,774,586 B1 | 9/2017 | Roche et al. | |
| 9,882,914 B1* | 1/2018 | Co | H04L 63/105 |
| 10,009,337 B1 | 6/2018 | Fischer et al. | |
| 10,044,723 B1 | 8/2018 | Fischer et al. | |
| 10,057,246 B1 | 8/2018 | Drozd et al. | |
| 10,153,897 B1* | 12/2018 | Jezewski | H04L 9/0819 |
| 11,140,163 B2* | 10/2021 | Borkar | H04W 12/06 |
| 11,222,109 B2 | 1/2022 | Okumura | |
| 2002/0087894 A1* | 7/2002 | Foley | H04L 63/083 726/4 |
| 2003/0208565 A1* | 11/2003 | Nishihara | H04L 63/08 709/219 |
| 2004/0225878 A1* | 11/2004 | Costa-Requena | H04L 63/08 713/150 |
| 2005/0135625 A1* | 6/2005 | Tanizawa | H04L 63/083 380/270 |
| 2006/0005038 A1* | 1/2006 | Kitahara | H04L 63/083 713/182 |
| 2006/0041939 A1* | 2/2006 | Schwartzman | H04L 63/08 726/15 |
| 2006/0280305 A1* | 12/2006 | Bajko | H04L 63/08 380/270 |
| 2007/0199059 A1* | 8/2007 | Takehi | G06F 21/31 726/10 |
| 2008/0033956 A1* | 2/2008 | Saha | G06F 21/6218 |
| 2008/0046521 A1* | 2/2008 | Yanagi | H04L 51/00 709/206 |
| 2008/0120711 A1* | 5/2008 | Dispensa | H04L 63/0869 726/5 |
| 2009/0006996 A1* | 1/2009 | Saha | G06F 21/6218 715/765 |
| 2009/0288138 A1* | 11/2009 | Kalofonos | H04L 67/104 726/2 |
| 2011/0030040 A1* | 2/2011 | Ronchi | G06F 21/60 726/5 |
| 2011/0032939 A1* | 2/2011 | Nozaki | H04L 67/2814 726/4 |
| 2011/0228311 A1* | 9/2011 | Oguma | G06F 21/608 358/1.14 |
| 2012/0254935 A1* | 10/2012 | Yato | H04L 9/321 726/1 |
| 2013/0036459 A1* | 2/2013 | Liberman | H04L 63/102 726/6 |
| 2013/0174241 A1* | 7/2013 | Cha | H04W 12/0431 726/7 |
| 2014/0289833 A1* | 9/2014 | Briceno | H04W 12/06 726/7 |
| 2014/0380462 A1* | 12/2014 | Hosoda | G06F 21/608 726/17 |
| 2015/0178029 A1* | 6/2015 | Miyazawa | H04N 1/0035 358/1.15 |
| 2015/0181060 A1* | 6/2015 | Miyazawa | H04N 1/00411 358/1.15 |
| 2015/0181061 A1* | 6/2015 | Miyazawa | H04N 1/00244 358/1.14 |
| 2015/0261972 A1* | 9/2015 | Lee | G06F 21/6218 713/165 |
| 2016/0094531 A1* | 3/2016 | Unnikrishnan | H04L 63/08 726/7 |
| 2016/0371475 A1* | 12/2016 | Zhao | H04L 63/08 |
| 2017/0026376 A1* | 1/2017 | Matsugashita | H04L 67/20 |
| 2018/0091538 A1* | 3/2018 | Narayanan | H04W 12/03 |
| 2018/0098184 A1* | 4/2018 | Tsuji | H04W 88/02 |
| 2018/0181352 A1* | 6/2018 | Saito | G06F 3/1205 |
| 2018/0255456 A1* | 9/2018 | Yin | H04W 12/041 |
| 2018/0262496 A1* | 9/2018 | Namboodiri | H04L 9/3247 |
| 2018/0285544 A1* | 10/2018 | Chang | G06K 9/00892 |
| 2018/0367699 A1* | 12/2018 | Sato | H04N 1/444 |
| 2019/0045360 A1* | 2/2019 | Greer | H04L 63/08 |
| 2019/0089710 A1* | 3/2019 | Weinert | G06Q 20/3226 |
| 2019/0149620 A1* | 5/2019 | Iwamoto | G06F 3/1219 709/223 |
| 2019/0156342 A1* | 5/2019 | Xia | G06Q 20/4016 |
| 2019/0222570 A1* | 7/2019 | Krishan | G06F 21/35 |
| 2019/0222576 A1* | 7/2019 | Borkar | H04L 63/0838 |
| 2019/0286811 A1 | 9/2019 | Okumura | |
| 2020/0195658 A1* | 6/2020 | Chien | H04L 63/108 |
| 2020/0287883 A1* | 9/2020 | Okumura | G06F 21/44 |

* cited by examiner

FIG. 4

| NAME | SCAN SETTINGS | STORAGE SETTINGS | | |
|---|---|---|---|---|
| | | STORAGE DESTINATION | STORAGE LOCATION | USE TOKEN |
| Scan-Up A | Image Scanner A High Resolution Color | Cloud Server | Service A | Default |
| Scan-to-PC | Image Scanner A Low Resolution Color | PC | Folder A | — |
| Scan-Up B | Image Scanner A High Resolution Monochrome | Cloud Server | Service B | Specific |
| Scan-Up C | Image Scanner A Low Resolution Monochrome | Cloud Server | Service B | Specific |

COMPUTER-READABLE MEDIUM, INFORMATION PROCESSING DEVICE, AND METHOD FOR PROVIDING BETTER ACCESSIBILITY TO CLOUD SERVER

CROSS-REFERENCE TO RELATED APPLICATION

This application claims priority under 35 U.S.C. § 119 from Japanese Patent Application No. 2019-039747 filed on Mar. 5, 2019. The entire subject matter of the application is incorporated herein by reference.

BACKGROUND

Technical Field

Aspects of the present disclosure are related to a non-transitory computer-readable medium, an information processing device, and a method for providing better accessibility to a cloud server.

Related Art

In recent years, technologies for uploading and downloading data between a cloud server and an information processing device (e.g., a PC and a smartphone) have been known. For instance, a technology for uploading data scanned by an image scanner to a cloud server has been disclosed.

SUMMARY

In general, a cloud server needs to be accessed using authentication information provided by the cloud server. The above disclosed technology does not suggest any details about obtaining or using authentication information. Thus, there is room for improvement in technologies for obtaining and using authentication information to access a cloud server.

Aspects of the present disclosure are advantageous to provide one or more improved techniques for providing better accessibility to a cloud server from an information processing device.

According to aspects of the present disclosure, a non-transitory computer-readable medium is provided, which stores computer-readable instructions executable by a processor of an information processing device communicably connected with an image processing apparatus and a cloud server. The computer-readable instructions realize an application configured to, when executed by the processor, cause the processor to, when receiving a workflow storing instruction to store a workflow, select one of a plurality of methods to obtain authentication information for accessing the cloud server set for the workflow to be stored, the workflow being a sequence of processes using the image processing apparatus and the cloud server, and when receiving a workflow execution instruction to perform the workflow, access the cloud server by using the authentication information obtained in the selected method.

According to aspects of the present disclosure, further provided is an information processing device that includes one or more communication interfaces configured to communicate with an image processing apparatus and a cloud server, and a controller configured to, when receiving a workflow storing instruction to store a workflow, select one of a plurality of methods to obtain authentication information for accessing the cloud server set for the workflow to be stored, the workflow being a sequence of processes using the image processing apparatus and the cloud server, and when receiving a workflow execution instruction to perform the workflow, access the cloud server by using the authentication information obtained in the selected method.

According to aspects of the present disclosure, further provided is a method implementable on a processor of an information processing device communicably connected with an image processing apparatus and a cloud server. The method includes selecting, when receiving a workflow storing instruction to store a workflow, one of a plurality of methods to obtain authentication information for accessing the cloud server set for the workflow to be stored, the workflow being a sequence of processes using the image processing apparatus and the cloud server, and accessing, when receiving a workflow execution instruction to perform the workflow, the cloud server by using the authentication information obtained in the selected method.

BRIEF DESCRIPTION OF THE ACCOMPANYING DRAWINGS

FIG. 4 shows an example of a workflow table in the illustrative embodiment according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, an illustrative embodiment according to aspects of the present disclosure will be described with reference to the accompanying drawings.

Figure 1:
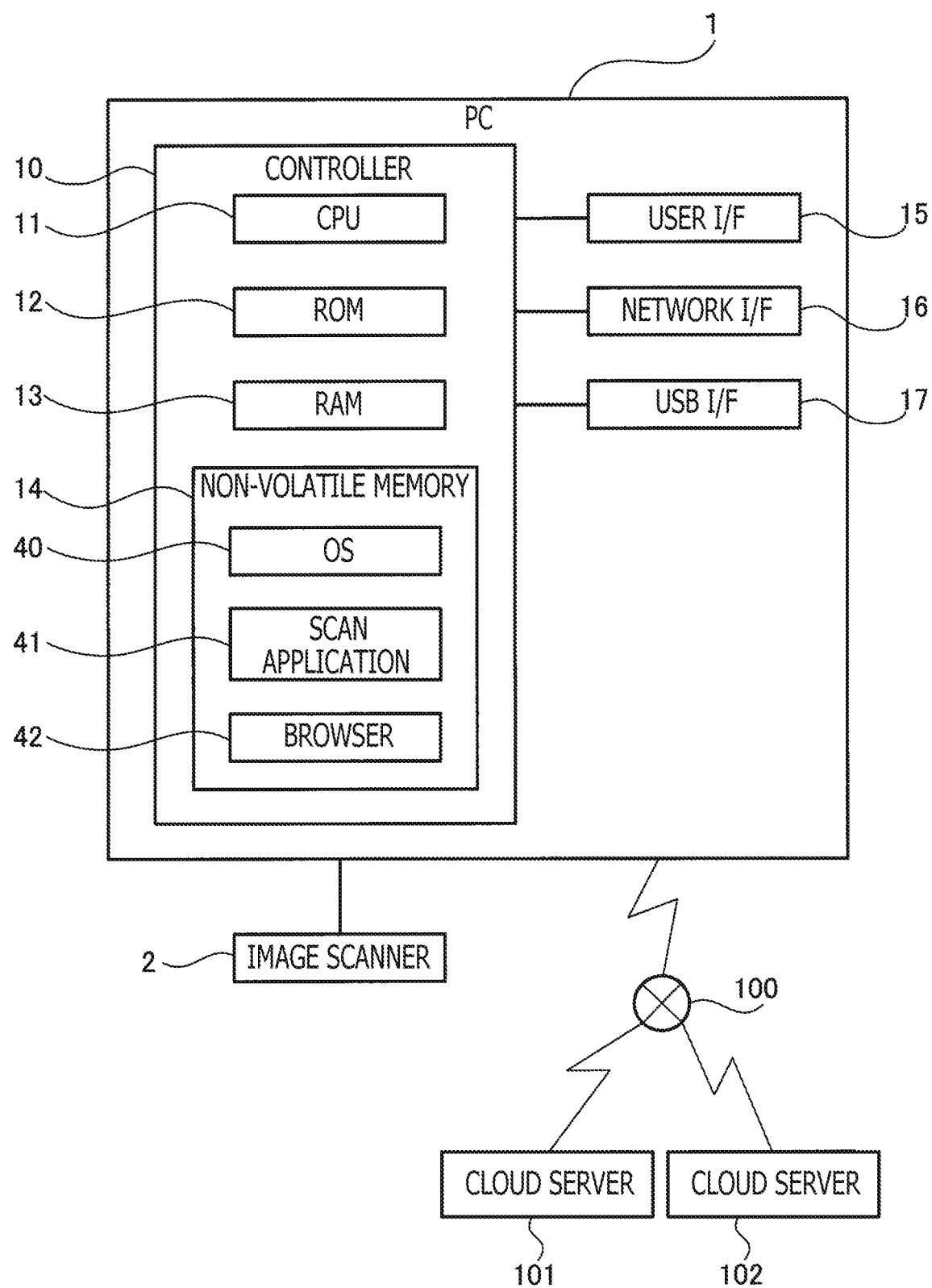
FIG. 1 is a block diagram schematically showing an electrical configuration of a PC in an illustrative embodiment according to one or more aspects of the present disclosure.

As shown in FIG. 1, a PC 1 of the illustrative embodiment is connected with an image scanner 2 and an Internet 100 and configured to execute various programs by using the image scanner 2 or the Internet 100. The PC 1 may be an example of an "information processing device" according to aspects of the present disclosure. In this regard, it is noted that examples of the "information processing device" may include, but are not limited to, tablet computers and smartphones as well as PCs.

The image scanner 2 is configured to scan images of a document, generate image data of the scanned images, and transmit the generated image data to the PC 1. The image scanner 2 may be an example of an "image processing apparatus" according to aspects of the present disclosure. It is noted that, in the illustrative embodiment, one or more image scanners 2 may be connected with the PC 1. Further, examples of the "image processing apparatus" connectable with the PC 1 may include, but are not limited to, copy machines, multi-function peripherals, fax machines, and digital cameras, as well as image scanners. Namely, any apparatuses or devices configured to obtain image data and transmit the obtained image data to the PC 1 may be connected with the PC 1.

The PC 1 has a function to receive image data from the image scanner 2 and a function to access cloud servers. For instance, as shown in FIG. 1, the PC 1 is connected with cloud servers 101 and 102 via the Internet 100. FIG. 1 shows an example in which the PC 1 is connected with the two cloud servers 101 and 102. Nonetheless, the PC 1 may be connected with three or more cloud servers.

A user of the PC 1 may use, via the PC 1, services provided by each cloud server. Examples of the services provided by each cloud server may include, but are not limited to, a service of managing one or more storage servers and an authentication server and uploading and downloading data between the PC 1 and the one or more storage servers. One of the one or more storage servers may double as an authentication server. Hereinafter, one or more storage servers and an authentication server managed in a single service may be referred to collectively as "cloud servers."

As shown in FIG. 1, the PC 1 includes a controller 10 including a CPU 11, a ROM 12, a RAM 13, and a non-volatile memory 14. The PC 1 further includes a user I/F ("I/F" is an abbreviation of "interface") 15, a network I/F 16, and a USB I/F 17 that are electrically connected with the controller 10. The CPU 11 may be an example of a "processor" according to aspects of the present disclosure. Examples of a "memory" according to aspects of the present disclosure may include, but are not limited to, a buffer of the CPU 11, the ROM 12, the RAM 13, and the non-volatile memory 14.

The ROM 12 stores programs such as a boot program for booting the PC 1. The RAM 13 is usable as a work area when the CPU 10 is performing various kinds of processing or as a storage area to temporarily store data. The non-volatile memory 14 is usable as an area to store various programs, various kinds of data (e.g., image data), and various settings. Examples of the non-volatile memory 14 may include, but are not limited to, HDDs and flash memories.

The CPU 11 is configured to perform various processes based on user operations or in accordance with programs read out of the ROM 12 or the non-volatile memory 14. It is noted that the "controller 10" shown in FIG. 1 is a generic term as which hardware elements and software elements used for controlling the PC 1 are collectively referred to. Hence, the "controller 10" may not necessarily represent a single hardware element actually existing in the PC 1.

The user I/F 15 includes one or more hardware elements for receiving user operations and displaying information. Namely, the user I/F 15 has both a function to receive inputs from the user and a function to display information. The user I/F 15 may be an example of a "display" according to aspects of the present disclosure. The user I/F 15 may include a device (e.g., a touch panel) having both the function to receive inputs from the user and the function to display information, or may have a combination including at least two of a display, a keyboard, and a mouse.

The network I/F 16 includes one or more hardware elements for communicating with external apparatuses (e.g., cloud servers) via the Internet 100. A communication system for the network I/F 16 may be any type of communication system such as a wireless communication system, a wired communication system, a LAN communication system, a Wi-Fi (registered trademark) communication system. Further, the USB I/F 17 includes one or more hardware elements for communicating with the image scanner 2. Instead of the USB I/F 17, the network I/F 16 may be configured to communicate with the image scanner 2.

The non-volatile memory 14 stores various kinds of data and programs including an OS ("OS" is an abbreviation of "Operating System") 40, a scan application 41, and a browser 42. A part of the OS 40 may be stored in the ROM 12. The scan application 41 is a program for performing various kinds of processing using the image scanner 2. The scan application 41 may be an example of an "application" according to aspects of the present disclosure. The scan application 41 will be described in detail later. The browser 42 is a program for displaying web pages.

It is noted that a storage medium storing the scan application 41 is not limited to the non-volatile memory 14. The storage medium storing the scan application 41 may be a non-transitory computer-readable storage medium. Examples of the non-transitory computer-readable storage medium may include, but are not limited to, recording media such as CD-ROMs and DVD-ROMs, as well as the aforementioned memories such as the buffer of the CPU 11, the ROM 12, the RAM 13, and the non-volatile memory 14. Further, the non-transitory computer-readable storage medium is a tangible medium. On the other hand, electrical signals carrying programs downloaded from servers on the Internet are computer-readable signal media but are not included in the examples of the non-transitory computer-readable storage medium.

Subsequently, the scan application 41 will be described. The scan application 41 is a program configured to, when executed by the CPU 11, cause the controller 10 to transmit scan settings and scanning instructions to the image scanner 2, receive and display image data of an image scanned by the image scanner 2, and store the received image data.

In the following description, processes, operations, and steps of flowcharts may basically represent processing by the CPU 11 in accordance with instructions written in programs such as the scan application 41. Namely, in the following description, operations such as "judging," "determining," "extracting," "selecting," "calculating," "specifying," "acquiring," "obtaining," "receiving," "accepting," and "controlling" may represent processing by the CPU 11. Processing by the CPU 11 may include hardware control using an API ("API" is an abbreviation of "Application Programming Interface") of the OS 40 for exchanging data with the other modules of the OS 40. In the present disclosure, operations by the CPU 11 executing each program may be described without any mention made of the OS 40. Specifically, for instance, a description "a program P controls a hardware element H" may represent "the CPU 11 executing a program P controls a hardware element H by using the API of the OS 40."

Further, "acquiring (obtaining)" may represent or include a concept of acquiring (obtaining) a thing with no need to make a request for the thing. Specifically, for instance, an operation of the CPU 11 receiving data without making a request for the data may be included in a concept "the CPU 11 acquires (obtains) the data." Further, "data" referred to in the present disclosure may be expressed as a computer-readable bit string. Further, two pieces of data that have substantially the same contents and have mutually different formats may be treated as the same data. The same applies to "information" referred to in the present disclosure. Further, "requesting" may represent or include a concept of transmitting information indicating a request to a destination party, and "instructing" may represent or include a concept of transmitting information indicating an instruction to a destination party. Moreover, information indicating a request and information indicating an instruction may be simply referred to as a "request" and an "instruction," respectively.

Further, a process by the CPU 11 in accordance with instructions written in a program may be described in an abbreviated language such as "the CPU 11 performs the process" without any mention made of a relevant program, or "the scan application 41 performs the process" and "a program A performs the process" without any mention made of the CPU 11. Further, determination by the CPU 11 as to whether information A represents a matter B may be described in a conceptional language such as "the CPU 11 determines from information A whether a matter B is correct." Further, determination by the CPU 11 as to whether information A represents a matter B or a matter C may be described in a conceptional language such as "the CPU 11 determines from information A whether a matter B is correct or a matter C is."

In the illustrative embodiment, the scan application 41 is configured to receive an instruction to store or perform a workflow. The workflow is information on a sequence of processes including image scanning and data storing. More specifically, the workflow includes scan setting information regarding scan settings for causing the image scanner 2 to scan an image of a document sheet and storage setting information regarding storage settings including a storage destination to store image data of the scanned image. When receiving a storage instruction to store a workflow, the scan application 41 may store, into the non-volatile memory 14, information on the workflow that contains scan setting information and storage setting information set based on the received storage instruction. Further, when receiving an execution instruction to perform a workflow, the scan application 41 may read out information on the specified workflow and perform image scanning and data storing based on the read information.

Figure 2:
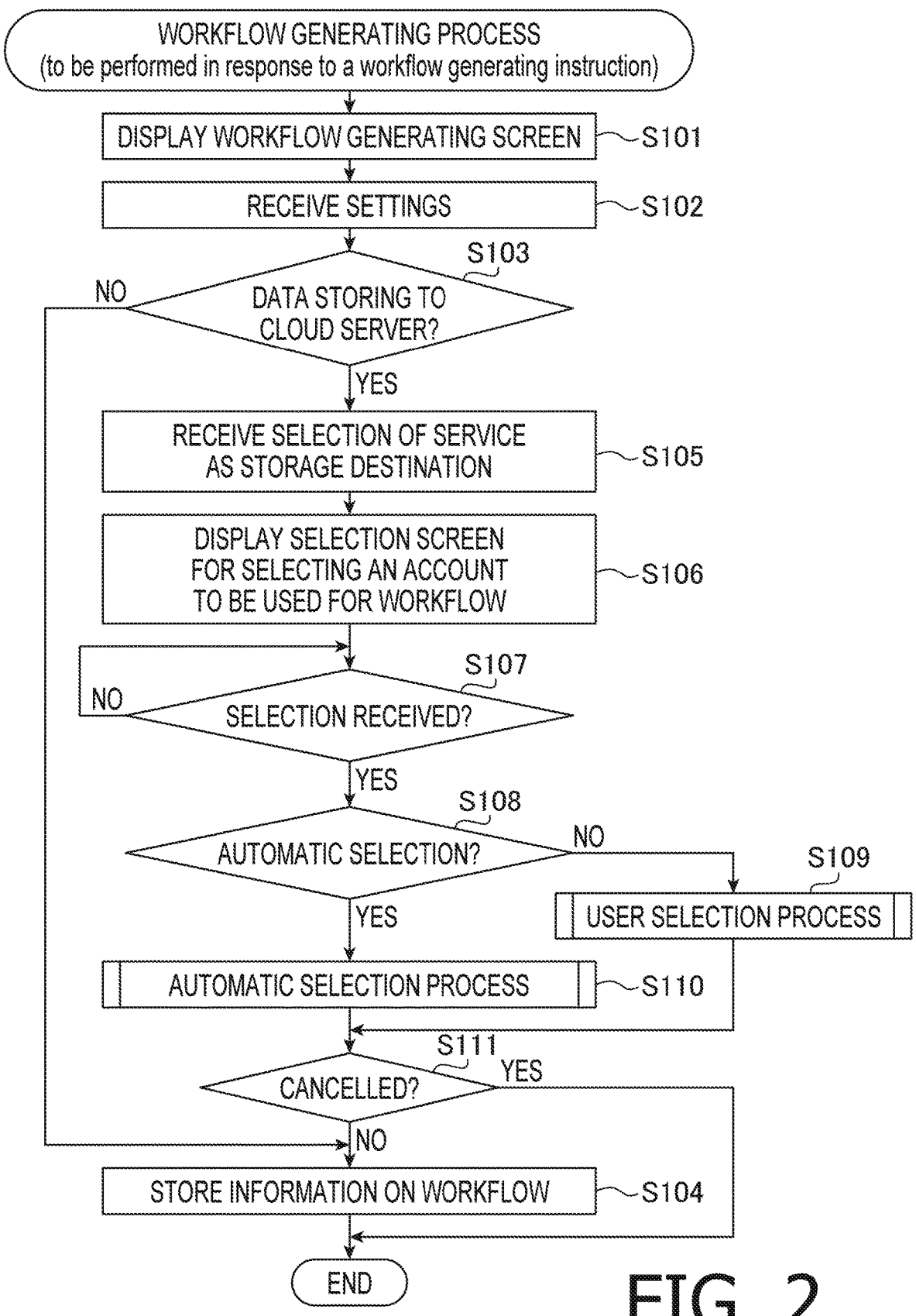
FIG. 2 is a flowchart showing a procedure of a workflow generating process in the illustrative embodiment according to one or more aspects of the present disclosure.

Referring to FIG. 2, an explanation will be provided of a procedure of a workflow generating process to generate and store a workflow by the CPU 11 executing the scan application 41. The workflow generating process is performed by the CPU 11 in response to the CPU 11 receiving a workflow generating instruction to generate and store the workflow via the scan application 41. The workflow generating instruction may be an example of a "workflow storing instruction."

Figure 3:
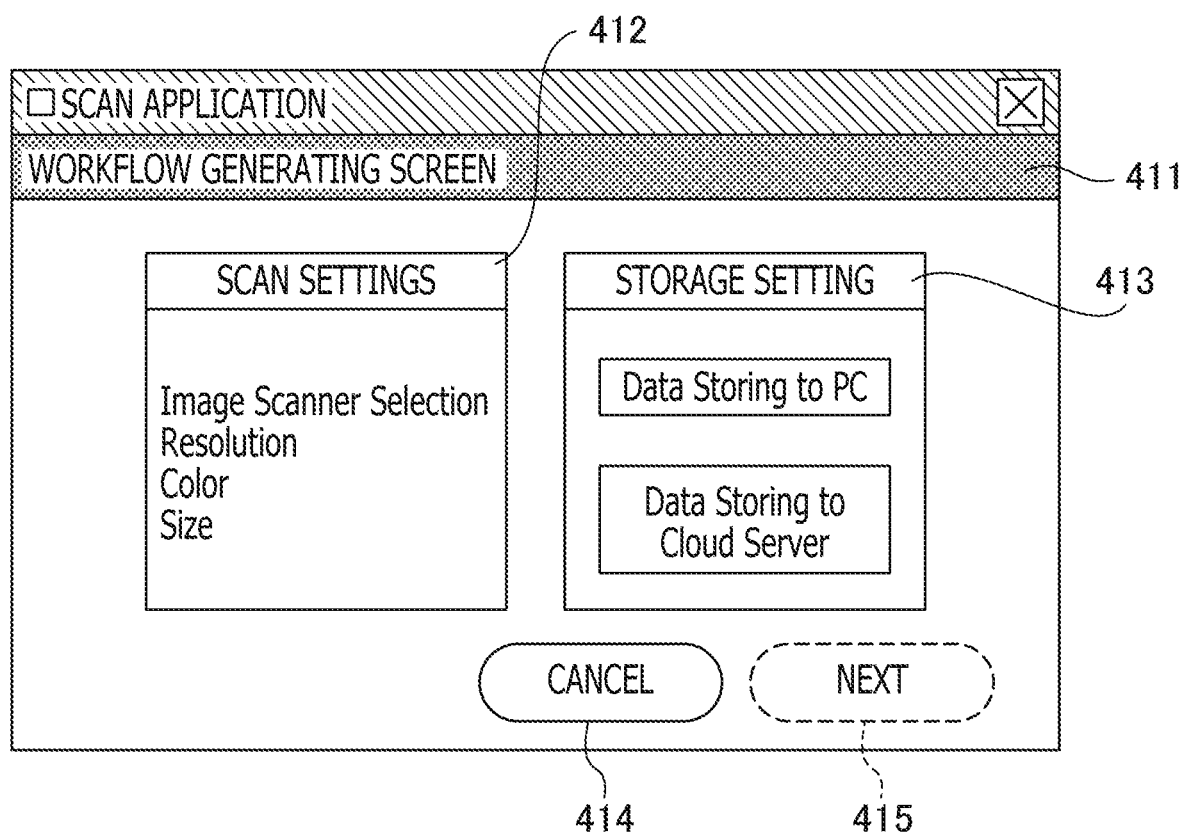
FIG. 3 shows an example of a workflow generating screen in the illustrative embodiment according to one or more aspects of the present disclosure.

In the workflow generating process, the CPU 11 causes the user I/F 15 to display a workflow generating screen for generating the workflow to be registered, on a display window for the scan application 41 (S101). FIG. 3 shows an example of the workflow generating screen. As shown in FIG. 3, the workflow generating screen 411 includes a scan setting window 412, a storage setting window 413, and a cancel button 414. The scan setting window 412 is for receiving the scan settings. The storage setting window 413 is for receiving the storage settings.

For instance, the scan application 41 may receive, as scan settings, a selection of an image scanner, a selection of a scanning resolution, a selection from color scanning and monochrome scanning, and a setting of a scanning size. Further, for instance, the scan application 41 may receive, as a storage setting, a specified one of "Data Storing to PC" and "Data Storing to Cloud Server." More specifically, in the illustrative embodiment, the scan application 41 may receive a selection from data storing to the non-volatile memory 14 of the PC 1 and data upload to a particular cloud server, as a storage destination of image data of the scanned image.

Then, on the workflow generating screen 411 being displayed, the CPU 11 receives selected values for the scan settings via the scan setting window 412 and receives a selection for the storage setting via the storage setting window 413 (S102). After receiving the scan settings and the storage setting, the CPU 11 causes the user I/F 17 to display a NEXT button 415 as an operable member, as indicated by a dashed line in FIG. 3. Thereby, in response to the NEXT button 415 being operated, the CPU 11 may receive an instruction to proceed to a process of storing the generated workflow into the non-volatile memory 14.

Specifically, when the NEXT button 415 is operated, the CPU 11 determines whether "Data Storing to Cloud Server" is selected as the storage setting (S103). When determining that "Data Storing to Cloud Server" is not selected as the storage setting (S103: No), i.e., that "Data Storing to PC" is selected as the storage setting, the CPU 11 further receives various settings such as a setting regarding a storage location in the PC 1, and thereafter stores information on the workflow that contains the received settings, into the non-volatile memory 14 (S104). Afterward, the CPU 11 terminates the workflow generating process.

The scan application 41 has a workflow table 81 (see FIG. 4) in a particular area of the non-volatile memory 14. The scan application 41 may store information on each workflow onto the workflow table 81 as a workflow record. In S104, the CPU 11 additionally stores, onto the workflow table 81, a workflow record containing information on the generated workflow. Hereinafter, a "workflow record" may be simply referred to as a "workflow." In this case, "storing the workflow" may represent "storing information on the workflow as a workflow record." Further, "performing the workflow" may represent "performing the workflow represented by the workflow record."

The workflow table 81 will be described below. As shown in FIG. 4, the workflow table 81 has, for each workflow, a name 811 of each workflow, scan settings 812, a storage destination 813, a storage location 814, and a use token 815.

The name 811 of each workflow is information for identifying each workflow. The scan settings 812 represent the scan settings received via the scan setting window 412 in the workflow generating process.

The storage destination 813 is information for specifying "Cloud Server" or "PC" as a storage destination for image data. When the storage destination 813 is "PC," the storage location 814 is information representing a folder into which image data is to be stored. When the storage destination 813 is "Cloud Server," the storage location 814 is information representing a service to which image data is to be uploaded. The scan application 41 has a plurality of services registered as selectable options for the storage location 814. In the workflow generating process, the scan application 41 may receive a selection from the registered services.

The use token 815 is information representing how to obtain a token to be used for the corresponding workflow when the storage destination 813 is "Cloud Server." An authentication procedure is required to upload image data to a cloud server. For instance, each service managing a cloud server has a management system to manage the cloud server in an authentication method using OAuth 2.0. In the authentication method using OAuth 2.0, the scan application 41 may obtain a token issued from an intended service by previously transmitting account information of the user to a corresponding cloud server, and may transmit a request with the obtained token to the intended service when using the service. The token(s) may be an example of "authentication information" according to aspects of the present disclosure. It is noted that a token itself is not stored on the workflow table 81.

Referring back to FIG. 2, the explanation of the workflow generating process is continued. When determining that "Data Storing to Cloud Server" is selected as the storage setting (S103: Yes), the CPU 11 receives a selection of a service as a storage destination (S105). Further, the CPU 11 causes the user I/F 15 to display a selection screen 51 for selecting a method to obtain an account to be used for performing the workflow (hereinafter, which may be referred to as the "target workflow") being currently generated (S106).

Figure 5:
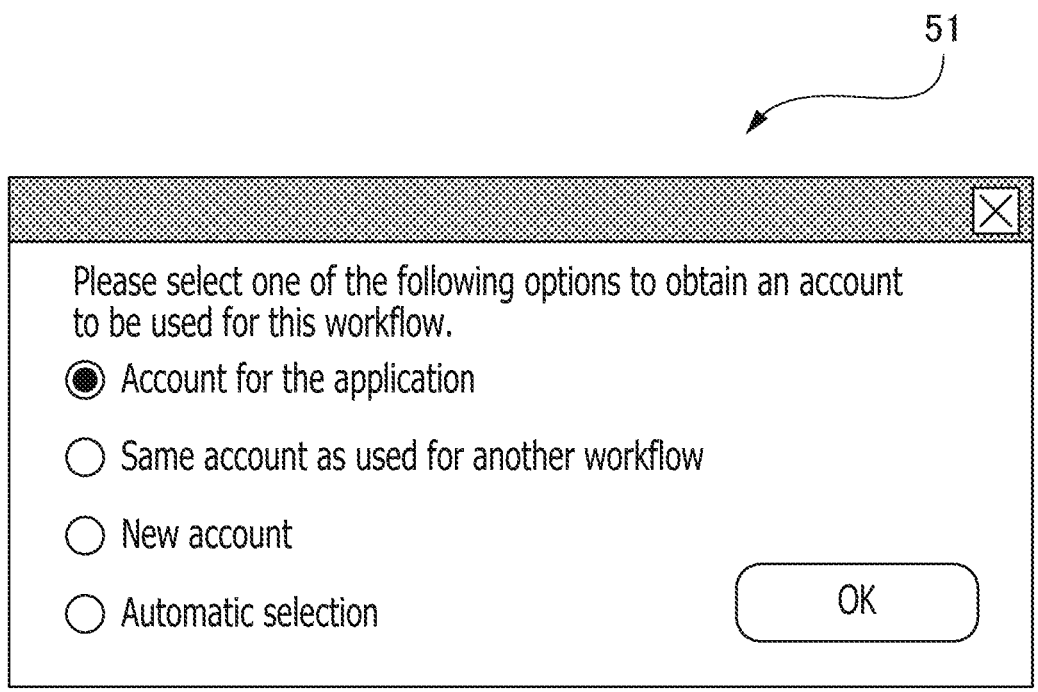
FIG. 5 shows an example of a selection screen for selecting a method to obtain an account to be used for a workflow being generated, in the illustrative embodiment according to one or more aspects of the present disclosure.

FIG. 5 shows an example of the selection screen 51. As shown in FIG. 5, for instance, the selection screen 51 may provide, as selectable options, "Account for the application," "Same account as used for another workflow," "New account," and "Automatic selection." The aforementioned "Account for the application" is an option representing a default account for the scan application 41. The aforementioned "Same account as used for another workflow" is an option representing an account corresponding to the use token 815 for a workflow registered on the workflow table 81. The aforementioned "New account" is an option representing that a new token is obtained via the authentication procedure. The aforementioned "Automatic selection" is an option representing that when the scan application 41 has a plurality of accounts registered therefor, an account to be used for the target workflow is automatically selected from among the plurality of accounts.

Based on a user's selection received via the selection screen 51, the scan application 41 causes the CPU 11 to determine information to be stored as the use token 815 on the workflow table 81 (see FIG. 4). As will be described later, for instance, information representing whether to use a specific token for the workflow or the default token for the scan application 41 may be stored as the use token 815. In another instance, information representing that a new token is obtained via the authentication procedure in an attempt to perform the workflow may be stored as the use token 815.

Referring back to FIG. 2, the explanation of the workflow generating process is continued. The CPU 11 determines whether the CPU 11 has received a selection via the selection screen 51 displayed on the user I/F 15 in S106 (S107). When determining that the CPU 11 has not received a selection via the selection screen 51 displayed on the user I/F 15 (S107: No), the CPU 11 waits until the CPU 11 receives a selection via the selection screen 51.

When determining that the CPU 11 has received a selection via the selection screen 51 displayed on the user I/F 15 (S107: Yes), the CPU 11 determines whether "Automatic selection" is selected (S108). When determining that "Automatic selection" is not selected (S108: No), the CPU 11 performs a user selection process to determine how to obtain a token based on a user's selection (S109).

Figure 6A:
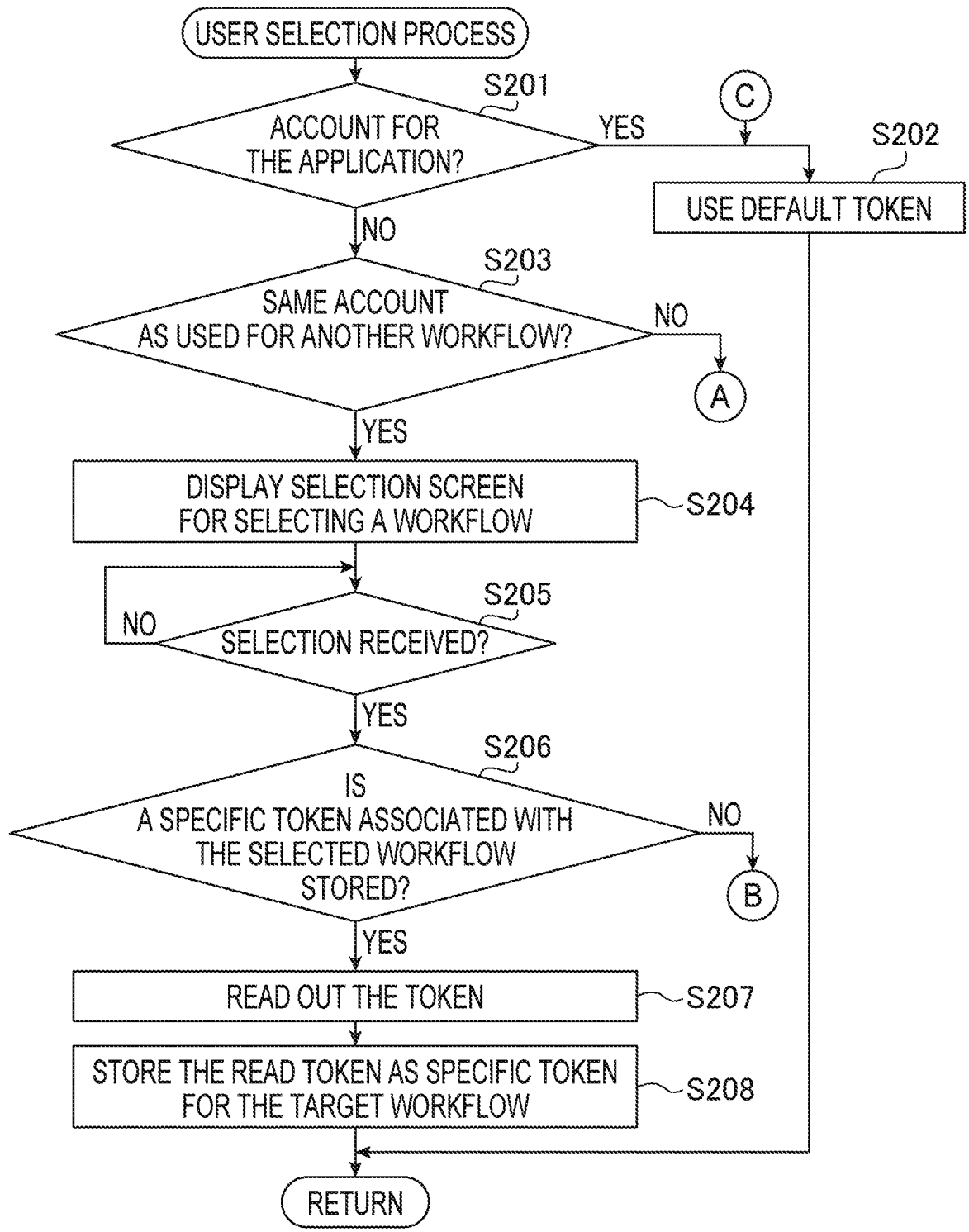
FIGS. 6A and 6B are flowcharts showing a procedure of a user selection process in the illustrative embodiment according to one or more aspects of the present disclosure.
Figure 6B:
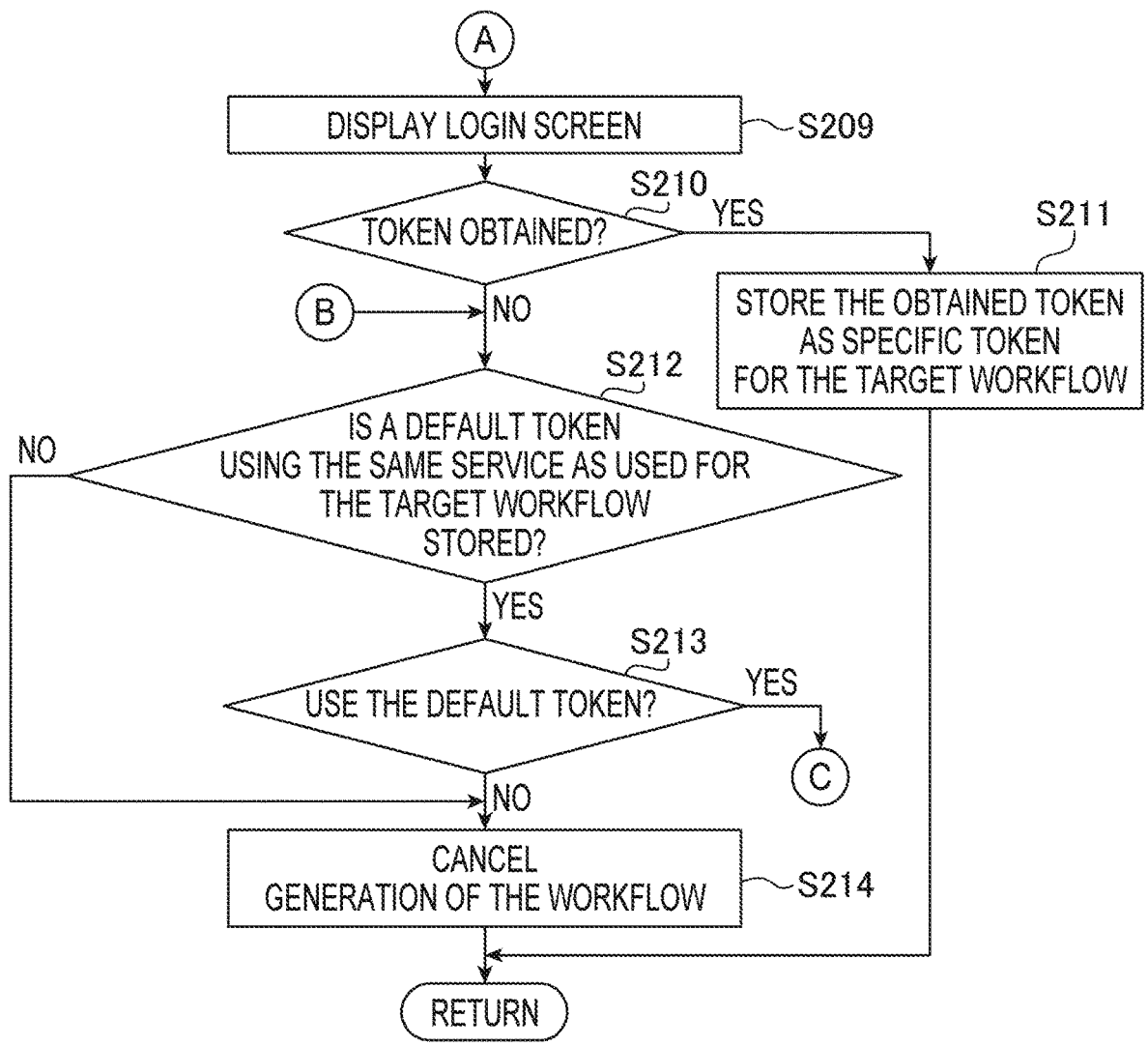

The user selection process will be described with reference to FIGS. 6A and 6B. In the user selection process, the CPU 11 determines whether "Account for the application" is selected via the selection screen (S201). As described above, "Account for the application" is an option representing the default account for the scan application 41. When determining that "Account for the application" is selected (S201: Yes), the CPU 11 determines to use the default token for the target workflow (S202). The CPU 11 set "Default" as the use token 815 for the workflow.

The default account is used by default when the scan application 41 uses a service for the workflow without using the workflow. For instance, the scan application 41 may obtain a token by accessing the service with the default account registered for the scan application 41 and performing the authentication procedure, and may store the obtained token as a default token to be used when the scan application 41 uses the service.

Figure 7:
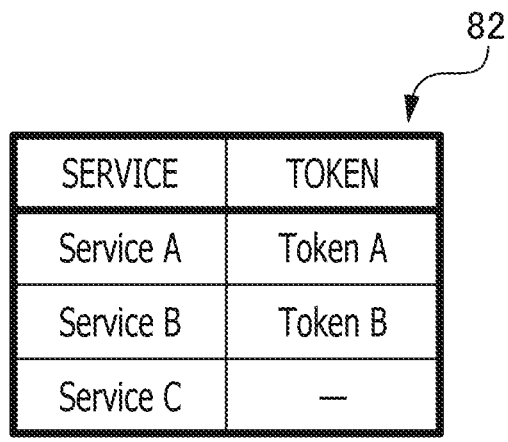
FIG. 7 shows an example of an authentication information table in the illustrative embodiment according to one or more aspects of the present disclosure.

For instance, the default token may be stored in association with information representing the corresponding service on an authentication information table 82 (see FIG. 7) in the non-volatile memory 14. In FIG. 7, each of "Service A," "Service B," and "Service C" is information representing a corresponding service. Further, each of "Token A" and "Token B" is information representing a corresponding token for using an associated service. FIG. 7 shows an example where a token (see "Token A") for "Service A" and a token (see "Token B") for "Service B" have been already obtained among three services available to the scan application 41, and the obtained tokens are stored, but a token for "Service C" has not been obtained. The authentication information table 82 may be an example of a "first table" according to aspects of the present disclosure.

When receiving an instruction to upload image data to a cloud server without using a workflow, if a token for a corresponding service is stored on the authentication information table 82, the scan application 41 may transmit, to the service, a request to which the token read out from the authentication information table 82 is attached. Each token stored on the authentication information table 82 is used in common when the scan application 41 uses a corresponding service. When receiving an instruction to upload image data to a cloud server without using a workflow, if a token for a corresponding service is not stored on the authentication information table 82, the scan application 41 may access the service and obtain a token via the authentication procedure, and may store the obtained token onto the authentication information table 82.

As will be described later, to perform a workflow associated with "Default" as the use token 815, the scan application 41 reads out a corresponding token from the authentication information table 82 and uses the token. A method in which a token is read out from the authentication information table 82 may be an example of a "first method" according to aspects of the present disclosure.

It is noted that even when it is determined to use a default token for a workflow, a corresponding token read out from the authentication information table 82 may be registered as a specific token for the workflow, instead of the use token 81 for the workflow being set to "Default." Specifically, in S202, the CPU 11 may read out a corresponding token from the authentication information table 82 and store the token in association with identification information of the target workflow onto a below-mentioned specific token table 83, and may set the use token 815 for the workflow to "Specific." As will be described later, to perform a workflow associated with "Specific" as the use token 815, the scan application 41 reads out a corresponding token from the specific token table 83 and use the token.

On the other hand, even when using the same service, the user may wish to use an account different from a default account to perform the target workflow. For instance, when the workflow is performed on a PC shared by a plurality of users, or when the registered workflow is shared by a plurality of users, a shared account may be used as a default account, and accounts different from the default account may be used as personal accounts. In this case, "Same account as used for another workflow" or "New account" may be selected via the selection screen 51.

When determining that "Account for the application" is not selected (S201: No), the CPU 11 determines whether "Same account as used for another workflow" is selected (S203). When determining that "Same account as used for another workflow" is selected (S203: Yes), the CPU 11 causes the user I/F 15 to display a selection screen for selecting a workflow (S204).

Specifically, the CPU 11 extracts workflows using the same service as used for the target workflow from among the workflows stored on the workflow table 81. Then, the CPU 11 causes the user I/F 15 to display a list of names of the extracted workflows. When there is no workflow using the same service as used for the target workflow among the workflows stored on the workflow table 81, for instance, the CPU 11 may cause the user I/F 15 to display an error message and then again display the selection screen 51 for selecting an account. In another instance, when there is no workflow using the same service as used for the target workflow among the workflows stored on the workflow table 81, the CPU 11 may cause the user I/F 15 to display the selection screen 51 from which the option "Same account as used for another workflow" is excluded.

Then, the CPU 11 determines whether the CPU 11 has received a selection from the list displayed on the user I/F 15 (S205). When determining that the CPU 11 has not received a selection from the list (S205: No), the CPU 11 waits until the CPU 11 receives a selection from the list. In this case, for instance, the CPU 11 may receive cancellation of workflow selection after displaying the list.

When determining that the CPU 11 has received a selection from the list (S205: Yes), the CPU 11 determines whether a specific token associated with the selected workflow is stored (S206).

Figure 8:
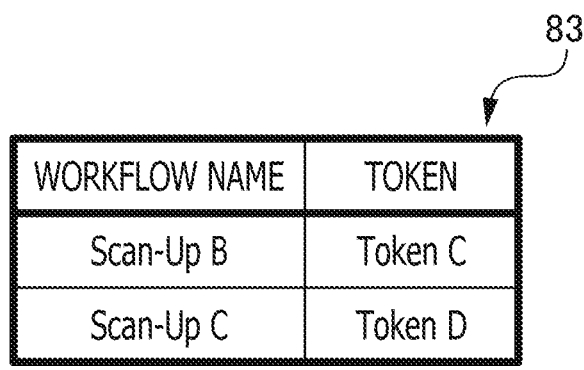
FIG. 8 is an example of a specific token table in the illustrative embodiment according to one or more aspects of the present disclosure.

For instance, the specific token may be stored on a specific token table 83 (see FIG. 8). In FIG. 8, each of "Scan-Up B" and "Scan-Up C" is information representing the name 811 of a corresponding workflow. Further, each of "Token C" and "Token D" is information representing a specific token to be used to perform an associated workflow. The specific token table 83 may be an example of a "second table" according to aspects of the present disclosure. The specific token table 83 may have a plurality of workflows registered thereon. Namely, the specific token table 83 may have one or more workflows each stored in association with a corresponding token.

Each token stored on the specific token table 83 may be, for instance, a specific token stored in association with identification information of a workflow in the workflow generating process of generating the workflow. Further, as will be described later, each token stored on the specific token table 83 may be updated for a reason such as expiration thereof.

When determining that a specific token associated with the selected workflow is stored on the specific token table 83 (S206: Yes), the CPU 11 reads out the token from the specific token table 83 (S207). Further, the CPU 11 stores, onto the specific token table 83, the read token in association with the identification information of the target workflow, and sets the use token 815 for the target workflow to "Specific" (S208). It is noted that the CPU 11 may exclude, from the list of the workflows, a workflow using the same service as used for the target workflow but not having "Specific" as the use token 815 therefor.

When determining that "Same account as used for another workflow" is not selected (S203: No), i.e., that "New account" is selected, the CPU 11 starts the authentication procedure with a new account. Specifically, for instance, the CPU 11 activates the browser 42 and causes the browser 42 to display a login screen for the corresponding service (S209). Further, the CPU 11 receives a user operation to input account information via the browser 42, and transmits the received account information to the corresponding cloud server.

The CPU 11 determines whether the CPU 11 has obtained a token corresponding to the transmitted account information from the cloud server (S210). When determining that the CPU 11 has obtained a token corresponding to the transmitted account information from the cloud server (S210: Yes), the CPU 11 uses the obtained token as a token for the target workflow. Specifically, the CPU 11 stores the obtained token onto the specific token table 83 in association with the identification information of the target workflow, and sets the use token 815 for the target workflow to "Specific" (S211).

When determining that a specific token associated with the selected workflow is not stored on the specific token table 83 (S206: No), or when determining that the CPU 11 has not obtained a token corresponding to the transmitted account information from the cloud server (S210: No), the CPU 11 determines whether a default token using the same service as used for the target workflow is stored on the authentication information table 82 (S212). When determining that a default token using the same service as used for the target workflow is stored on the authentication information table 82 (S212: Yes), the CPU 11 determines whether to use the default token (S213). For instance, the CPU 11 may inquire of the user whether to use the default token.

When determining that the use of the default token has been accepted (S213: Yes), the CPU 11 determines to use the default token (S202). When determining that a default token using the same service as used for the target workflow is not stored on the authentication information table 82 (S212: No), or when determining that the use of the default token has not been accepted (S213: No), the CPU 11 determines to cancel the generation of the workflow (S214). After one of the steps S202, S208, S211, and S214, the CPU 11 terminates the user selection process and returns to the workflow generating process (see FIG. 2).

Referring back to FIG. 2, the explanation of the workflow generating process is continued. When determining that "Automatic selection" is selected via the selection screen 51 (S108: Yes), the CPU 11 performs an automatic selection process to automatically determine how to obtain a token (S110).

Figure 9:
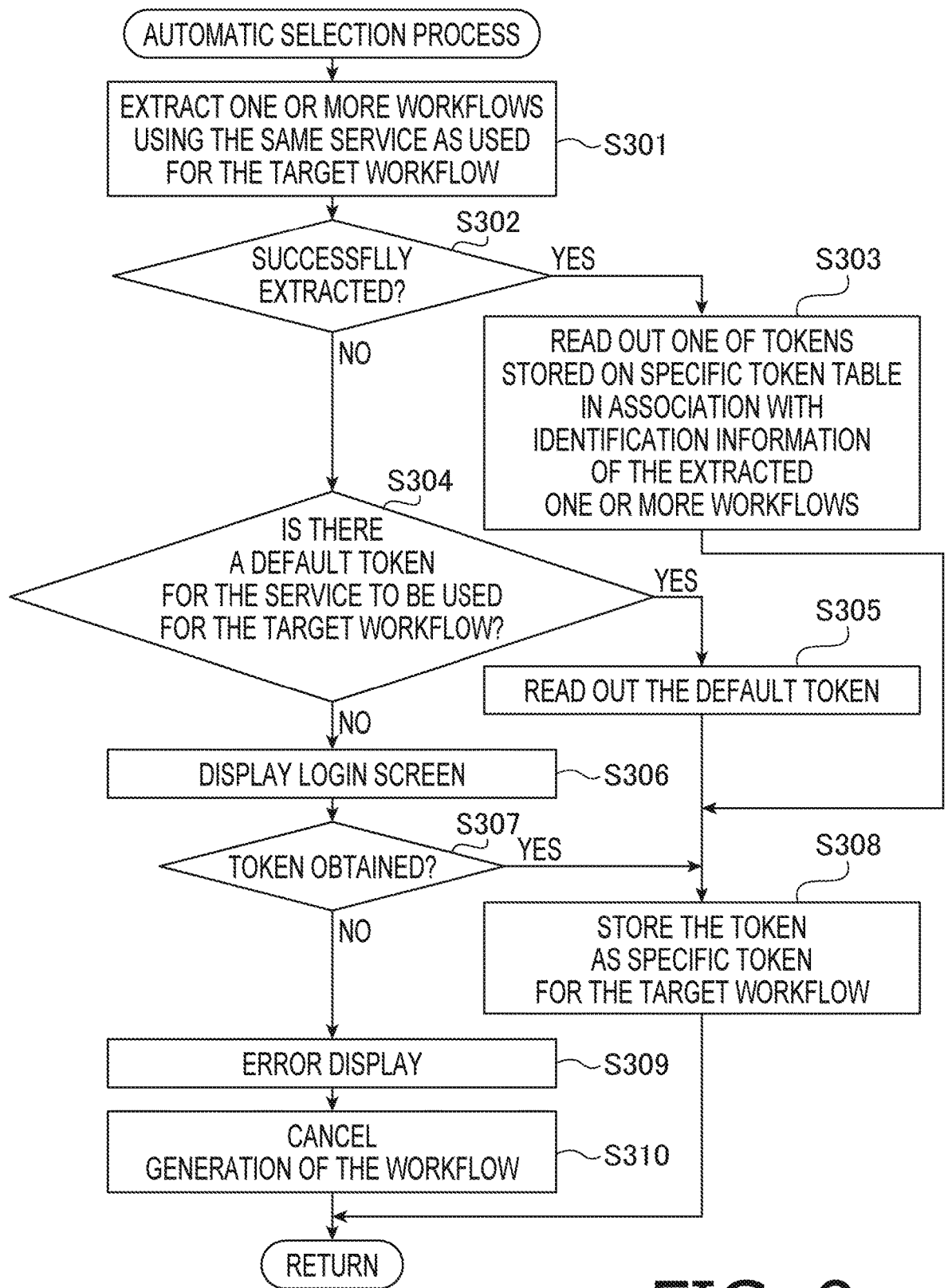
FIG. 9 is a flowchart showing a procedure of an automatic selection process in the illustrative embodiment according to one or more aspects of the present disclosure.

The automatic selection process will be described with reference to FIG. 9. In the automatic selection process, the CPU 11 attempts to extract one or more workflows using the same service as used for the target workflow from among workflows of which identification information is registered on the specific token table 83 (S301). Then, the CPU 11 determines whether the CPU 11 has successfully extracted one or more workflows (S302).

When determining that the CPU 11 has successfully extracted one or more workflows (S302: Yes), the CPU 11 reads out one of tokens stored on the specific token table 83 in association with the identification information of the extracted one or more workflows (S303). For instance, when a plurality of workflows are extracted, the CPU 11 may read out a token associated with the identification information of a latest one of the extracted workflows. In another instance, the CPU 11 may receive a user's selection from the extracted workflows. In a further instance, in S303, the CPU 11 may cause the user I/F 15 to display the name 811 of the extracted workflow, and may receive a user's selection as to whether to use the same token as used for the workflow having the name 811 displayed on the user I/F 15. Thus, even in the automatic selection process, it is possible to prevent setting of an account unintended by the user, by accepting such user's selections.

When determining that the CPU 11 has not successfully extracted one or more workflows (S302: No), the CPU 11 determines whether there is a default token for the service to be used for the target workflow (S304). Namely, the CPU 11 determines whether a token for the corresponding service is stored on the authentication information table 82. When determining that there is a default token for the service to be used for the target workflow (S304: Yes), the CPU 11 reads out the default token from the authentication information table 82 (S305).

When determining that there is not a default token for the service to be used for the target workflow (S304: No), the CPU 11 causes the browser 42 to display the login screen for the service, thereby prompting the user to perform the authentication procedure (S306).

Then, the CPU 11 determines whether the CPU 11 has obtained a token from the service (S307). After S303 or S305, or when determining that the CPU 11 has obtained a token from the service (S307: Yes), the CPU 11 stores the obtained token onto the specific token table 83, and sets the use token 815 for the target workflow to "Specific" (S308).

Meanwhile, when determining that the CPU 11 has not obtained a token from the service (S307: No) (e.g., when the authentication was unsuccessful, or time has run out before the authentication procedure is performed), the CPU 11 causes the user I/F 15 to display, for instance, an error message representing that the automatic selection was unsuccessful (S309). Afterward, the CPU 11 determines to cancel the generation of the workflow (S310). After S308 or S309, the CPU 11 terminates the automatic selection process, and returns to the workflow generating process (see FIG. 2).

Referring back to FIG. 2, the explanation of the workflow generating process is continued. In the workflow generating process, the CPU 11 determines whether the generation of the workflow has been cancelled in the user selection process in S109 or the automatic selection process in S110 (S111). When determining that the generation of the workflow has not been cancelled (S111: No), the CPU 11 determines a name and an icon of the generated workflow, and then adds information on the workflow onto the workflow table 81 (S104). Thereafter, the CPU 11 terminates the workflow generating process. When determining that the generation of the workflow has been cancelled (S111: Yes), the CPU 11 terminates the workflow generating process, without storing information on the workflow.

Figure 10A:
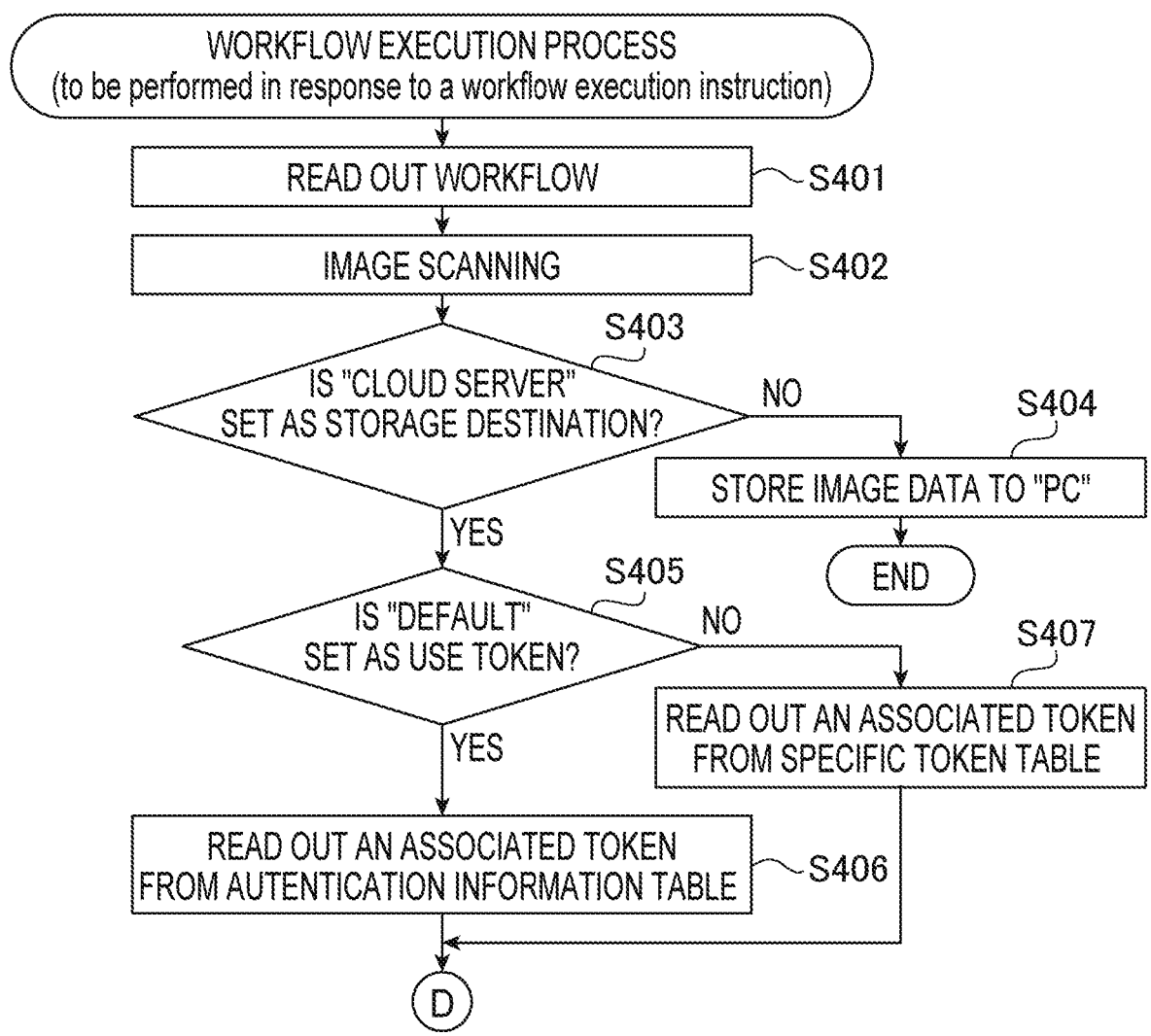
FIGS. 10A and 10B are flowcharts showing a procedure of a workflow execution process in the illustrative embodiment according to one or more aspects of the present disclosure.
Figure 10B:
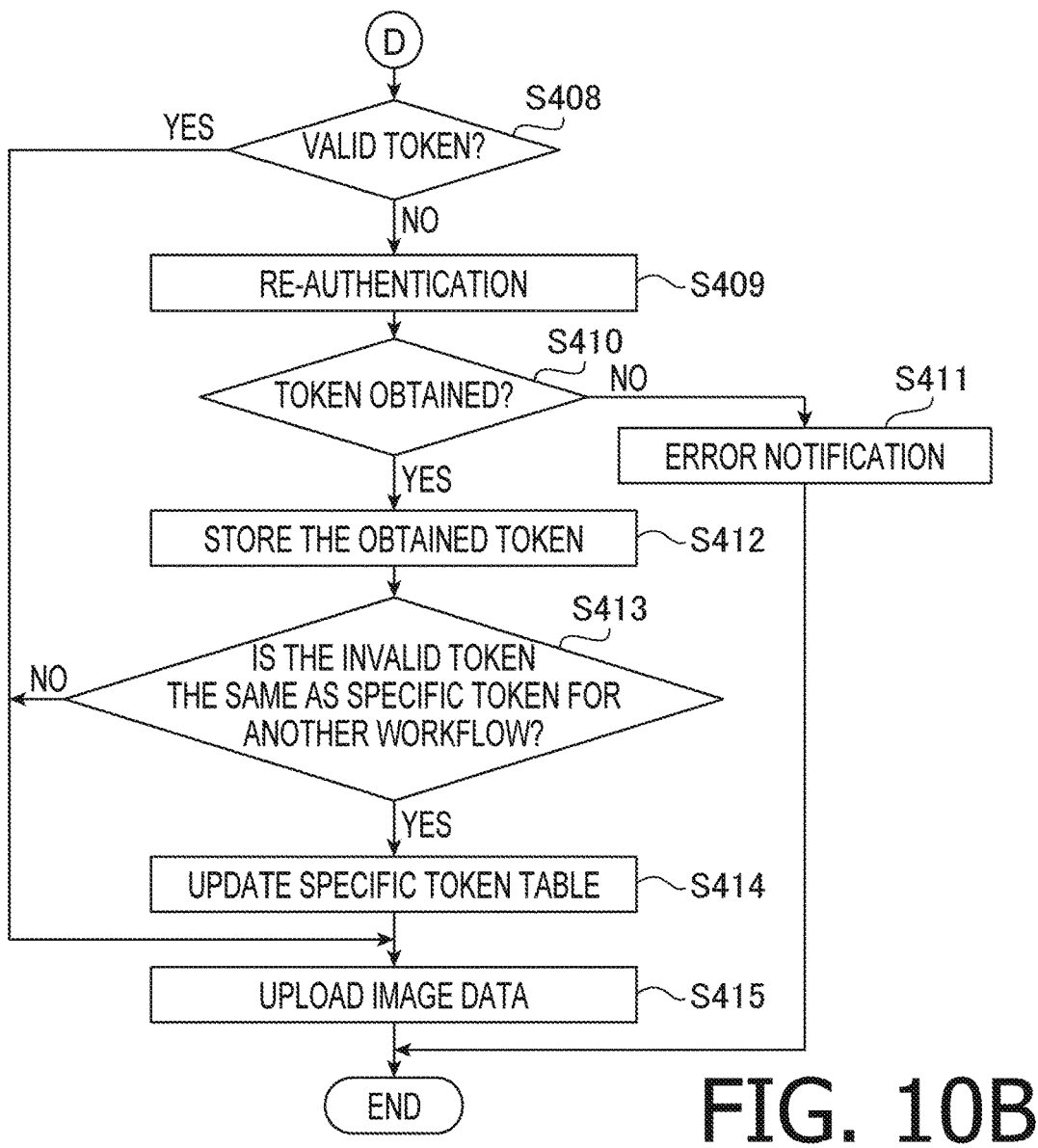

Subsequently, referring to FIGS. 10A and 10B, an explanation will be provided of a workflow execution process by the CPU 11 executing the scan application 41 in the illustrative embodiment. The scan application 41 may receive an operation of selecting one of the workflows registered on the workflow table 81 stored in the non-volatile memory 14. Further, the scan application 41 may receive an operation of providing a workflow execution instruction to perform the selected workflow. The CPU 11 performs the workflow execution process in response to receiving the selection of the workflow and the workflow execution instruction via the scan application 41.

In the workflow execution process, first, the CPU 11 reads out a workflow record of the selected workflow from the workflow table 81 (S401). Based on the read information, the CPU 11 causes the image scanner 2 to perform image scanning in accordance with the scan settings 812 for the selected workflow, thereby obtaining image data (S402).

Further, the CPU 11 determines whether "Cloud Server" is set as the storage destination 813 for the selected workflow (S403). When determining that "Cloud Server" is not set as the storage destination 813 for the selected workflow (S403: No), i.e., that that "PC" is set as the storage destination 813 for the selected workflow, the CPU 11 stores the image data obtained in S402 into a folder specified as the storage location 814 (S404). Afterward, the CPU 11 terminates the workflow execution process.

Meanwhile, when determining that "Cloud Server" is set as the storage destination 813 for the selected workflow (S403: Yes), the CPU 11 determines whether "Default" is stored as the use token 815 for the selected workflow (S405). When determining that "Default" is stored as the use token 815 for the selected workflow (S405: Yes), i.e., that a default token is used for the selected workflow, the CPU 11 reads out a token associated with a service stored as the storage location 814 for the selected workflow, from the authentication information table 82 (S406).

Meanwhile, when determining that "Default" is not stored as the use token 815 for the selected workflow (S405: No), i.e., that a specific token is used for the selected workflow, the CPU 11 reads out a token associated with identification information of the selected workflow, from the specific token table 83 (S407).

The CPU 11 determines whether the token read in S406 or S407 is valid (S408). For instance, when storing a token onto the authentication information table 82 or the specific token table 83 in the aforementioned workflow generating process, the CPU 11 may store an expiration date and time of the token as well. In this case, the CPU 11 may make the determination in S408 based on the stored expiration date and time. Namely, when the current date and time has passed the expiration date and time read in S406 or S407, the CPU 11 may determine that the token is not valid. In another instance, the CPU 11 may transmit to the cloud server a below-mentioned request for uploading of the obtained image data, and may make the determination in S408 based on whether the image data has been successfully uploaded. In this case, when the image data has been successfully uploaded, the CPU 11 may terminate the workflow execution process. Meanwhile, when the image data has not been successfully uploaded, the CPU 11 may determine that the token is not valid (S408: No) and go to S409.

When determining that the token is not valid (S408: No), the CPU 11 performs re-authentication (S409). For instance, the CPU 11 may cause the user OF 15 to display a login screen for the designated service via the browser 42, thereby prompting the user to perform necessary operations for re-authentication. In another instance, the CPU 11 may inquire of the user whether to perform re-authentication. Further, the CPU 11 determines whether the CPU 11 has obtained a token from the service via successful re-authentication (S410).

When determining that the CPU 11 has not obtained a token from the service via successful re-authentication (e.g., when having failed in the re-authentication or having received an instruction not to perform re-authentication) (S410: No), the CPU 11 provides an error notification that the CPU 11 has failed to perform the workflow (S411). Thereafter, the CPU 11 terminates the workflow execution process. It is noted that, in this case, the CPU 11 deletes the image data obtained in S402 before terminating the workflow execution process.

When determining that the CPU 11 has obtained a token from the service via successful re-authentication (S410: Yes), the CPU 11 stores the obtained token by replacing the invalid token read out in S406 or S407 with the obtained token (S412). Thus, when the token read out of the authentication information table 82 in S406 has expired, the CPU 11 updates the token stored on the authentication information table 82. Further, when the token read out of the specific token table 83 in S407 has expired, the CPU 11 updates the token stored on the specific token table 83.

Further, the CPU 11 determines whether the expired token is the same as a specific token for another workflow (S413). Specifically, the CPU 11 determines whether the same token as the expired token is stored in association with identification information of another workflow stored on the specific token table 83. When determining that the expired token is the same as a specific token for another workflow (S413: Yes), the CPU 11 replaces the same token as the expired token on the specific token table 83 with the token obtained via successful re-authentication (S414).

When determining that the read token is valid (S408: Yes) or that the expired token is not the same as a specific token for another workflow (S413: No), or after S414, the CPU 11 uploads the image data obtained in S402 to the service by using the corresponding token (S415). Afterward, the CPU 11 terminates the workflow execution process.

Figure 11:
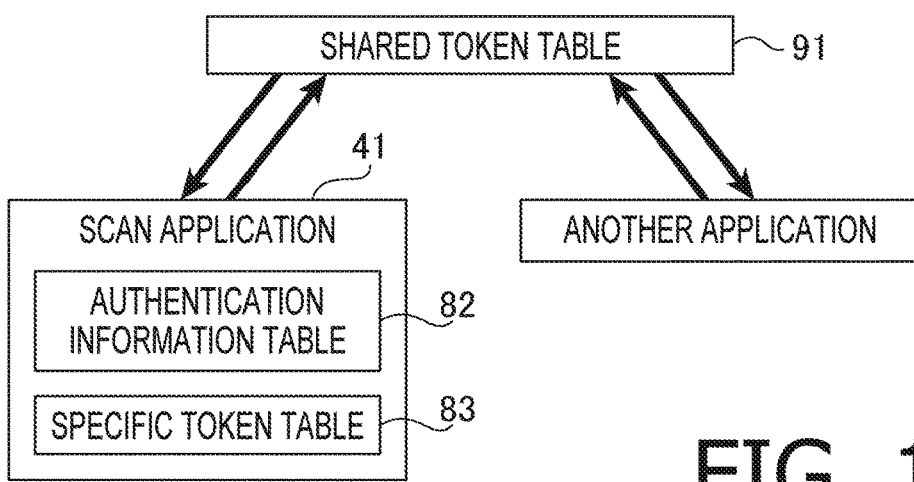
FIG. 11 shows an example of a configuration in which tokens are shared by both a scan application and another application that are incorporated in the PC, in a modification according to one or more aspects of the present disclosure.

The PC 1 may have another application for using the services provided by the cloud servers, besides the scan application 41. In this case, the scan application 41 and the said another application may share the tokens with each other. For instance, as shown in FIG. 11, the PC 1 may have a shared token table 91 in a particular area referable from both the scan application 41 and the said another application, separately from the authentication information table 82 and the specific token table 83 managed by the scan application 41. In this case, the shared token table 91 may store thereon information on each shared token in association with identification information of a corresponding service. The shared token table 91 may be an example of a "third table" according to aspects of the present disclosure.

In this case, for instance, when making the negative determination in S302 of the automatic selection process (S302: No), if the shared token table 91 stores information on a token associated with the identification information of the service used for the target workflow, the CPU 11 executing the scan application 41 may obtain the information on the token from the shared token table 91.

It is noted that the scan application 41 may have the shared token table 91 instead of the authentication information table 82. In this case, each default token may be registered on the shared token table 91.

As described above, according to the scan application 41 of the illustrative embodiment, in the workflow generating process to generate a workflow and store the generated workflow onto the workflow table 81, the PC 1 selects a method for obtaining authentication information for the workflow, and accesses a corresponding cloud server with the authentication information obtained in the selected method, to perform the workflow. Thereby, the user may selectively use different pieces of authentication information for accessing a corresponding cloud server. Thus, it is possible to improve user-friendliness of the PC 1.

For instance, when selecting one of the methods for obtaining authentication information, the scan application 41 of the illustrative embodiment may select a particular method in which the scan application 41 obtains a token registered on the authentication information table 82. Further, when the particular method is not selected, the scan application 41 may obtain a token from a source other than the authentication information table 82 and register the obtained token onto the specific token table 83 in association with a target workflow. Then, in an attempt to access a corresponding cloud server, when the particular method is selected, the scan application 41 may use an associated token read out of the authentication information table 82. Meanwhile, when the particular method is not selected, the scan application 41 may use an associated token read out of the specific token table 83. Thereby, the user may selectively use different tokens depending on whether the user wishes to access the cloud server by using a specific account or a shared account. Thus, it is possible to omit user operations for authentication in the attempt to access the corresponding cloud server to perform the target workflow and also possible to access the corresponding cloud server by using an appropriate account depending on the intended use.

Further, in the illustrative embodiment, when a selection of using a token registered on the authentication information table 82 is not made, the scan application 41 may access the cloud server to obtain a token to be registered onto the specific token table 83. Thereby, it is possible to certainly obtain the token.

Further, in the illustrative embodiment, when a section of using a token registered on the authentication information table 82 is not made, the scan application 41 may read out, from the specific token table 83, a token for a workflow using the same cloud server as used for the target workflow, and may register the read token ono the specific token table 83. Thereby, it is possible to obtain the token with no need to access the cloud server or request the user to input information necessary for the authentication procedure.

Further, in the illustrative embodiment, the user may select a method for obtaining a token, during the workflow generating process to generate the target workflow. Thereby, it is possible to select a utility form (e.g., shared or for individual use) of the target workflow.

Further, in the illustrative embodiment, the scan application 41 may receive a selection of automatically obtaining a token. When the selection of automatically obtaining a token is made, and one or more tokens are registered on the specific token table 83, the target workflow is highly likely to be used individually for each account. Therefore, the scan application 41 may obtain a token from the specific token table 83. Meanwhile, when no authentication information is registered on the specific token table 83, the target workflow is less likely to be used individually for each account. Hence, the scan application 41 may obtain a default token from the authentication information table 82. Thereby, it is possible to select an appropriate method for obtaining a token, depending on whether there is a token registered on the specific token table 83.

Further, in the illustrative embodiment, in an attempt to perform the selected workflow, when it is determined that the obtained token has expired, the authentication information table 82 or the specific token table 83 is updated. Thereby, in the next attempt to perform the workflow, the updated token is available. Further, when the same token as used for the workflow is registered on the specific token table 83 in association with another workflow using the same service as used for the workflow, the token for the said another workflow is updated as well. Therefore, the updated token is available when the said another workflow is performed.

Hereinabove, the illustrative embodiment according to aspects of the present disclosure has been described. Aspects of the present disclosure may be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that aspects of the present disclosure may be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that aspects of the present disclosure are capable of use in various other combinations and environments and are capable of changes or modifications within the scope of the inventive concept as expressed herein. For instance, the following modifications according to aspects of the present disclosure are feasible.

For instance, an image processing apparatus connected with the PC 1 is not limited to an apparatus (e.g., the image scanner 2) to obtain image data, but may be an apparatus (e.g., a printer) to perform printing based on image data. Namely, aspects of the present disclosure may be applied not only to a workflow storing a sequence of processes including scanning an image and storing image data of the scanned image, but also to a workflow storing a sequence of processes including downloading image data from a cloud server and printing an image based on the downloaded image data.

Further, for instance, an instruction to store a workflow is not limited to the workflow generating instruction, but may be an import instruction to read an export file, import the workflow from the export file, and add the workflow onto the workflow table 81. In this case, settings contained in the read export file may be used, instead of receiving user's selections in S101 to S105 of the workflow generating process. Further, when the export file contains information on a token, the token may be registered onto the specific token table 83 in association with identification information of the workflow.

In the aforementioned illustrative embodiment, it is determined whether to perform the automatic selection process by a user's selection. Nonetheless, for instance, the option "Automatic selection" to perform the automatic selection process may not be included in the options selectable on the selection screen 51 (see FIG. 5). In another instance, the automatic selection process may be only an available method for obtaining a token.

Further, for instance, the workflow table 81 may not include the field of the use token 815. In this case, in the workflow execution process, the CPU 11 may search the specific token table 83, instead of performing S405. Further, in this case, when determining that identification information associated with the selected workflow is stored on the specific token table 83, the CPU 11 may go to S407. Meanwhile, when determining that identification information associated with the selected workflow is not stored on the specific token table 83, the CPU 11 may go to S406.

In the aforementioned illustrative embodiment, even though receiving a user's selection of using the same account as used for another workflow (S203: Yes), when a workflow using the same service as used for the target workflow is not stored on the workflow table 81, or a token associated with the selected workflow is not stored on the specific token table 83, the CPU 11 determines whether to use the default token. Nonetheless, in such a case, the CPU 11 may determine that an error has occurred, and may go back to S201 to receive a user's re-selection. Further, in the aforementioned illustrative embodiment, even though receiving a user's selection of using a new account (S203: No), when having failed to obtain a token, the CPU 11 determines whether to use the default token. Nonetheless, in such a case, the CPU 11 may determine that an error has occurred, and may go back to S201 to receive a user's re-selection.

In the aforementioned illustrative embodiment, when making the negative determination in S212 (S212: No) or in S213 (S213: No) of the user selection process, the CPU 11 cancels generation of the target workflow. Nonetheless, in such a case, the CPU 11 may generate the target workflow without determining how to obtain a token. For instance, the CPU 11 may generate a workflow having "Specific" as the use token 815, without storing a token onto the specific token table 83. In this case, in S407 of the workflow execution process, the CPU 11 fails to read out a token associated with identification information of the selected workflow from the specific token table 83. Hence, the CPU 11 may make the negative determination in S408 (S408: No) and go to S409 to perform re-authentication.

Further, for instance, in S209 of the user selection process, or in S306 of the automatic selection process, when determining that the CPU 11 has obtained a token for a new account from the cloud server, and a default token for the corresponding service is not stored on the authentication information table 82, the CPU 11 may store the obtained token as a default token onto the authentication information table 82. Further, the CPU 11 may inquire of the user whether to register the obtained token as a default token.

Further, in the workflow execution process, the CPU 11 may perform image scanning after determining how to store image data of the scanned image. Specifically, the CPU 11 may perform image scanning immediately before S404 or S415.

Further, for instance, the scan application 41 may not have a plurality of cloud servers as selectable upload destinations. Namely, the scan application 41 may have a single cloud server as a fixed upload destination to which image data is uploaded via the scan application 41. Further, for instance, the authentication information table 82 may be configured to store each token in association not only with information on a corresponding service but also with user information.

Further, for instance, after reading out a token stored on the workflow table 81 or the authentication information table 82, the CPU 11 may check whether the read token is valid. In this case, for instance, the CPU 11 may inquire of the cloud server whether the read token is valid. In another instance, the CPU 11 may store, onto the workflow table 81 and/or the authentication information table 82, each token in association with information regarding an expiration date and time and/or the number of times that each token is usable as a valid token. In this case, the CPU 11 may determine whether the read token is valid, with reference to the workflow table 81 or the authentication information table 82.

Further, in each of the flowcharts exemplified in the aforementioned illustrative embodiment, some of the steps may be performed in a different execution sequence or in parallel within a scope consistent with the processing concept of each flowchart as expressed in the present disclosure.

Further, each of the processes exemplified in the aforementioned illustrative embodiment may be performed solely or in combination by at least one of hardware elements such as CPUs and ASICs. In addition, each process exemplified in the aforementioned illustrative embodiment may be practiced in various aspects, e.g., in computer software as a program storable on a computer-readable medium, or in a method implementable on a computer.

The following shows examples of associations between elements exemplified in the aforementioned illustrative embodiment and modifications and elements according to aspects of the present disclosure. The PC 1 may be an example of an "information processing device" according to aspects of the present disclosure. The image scanner 2 may be an example of an "image processing apparatus" according to aspects of the present disclosure. The CPU 11 may be an example of a "processor" according to aspects of the present disclosure. Examples of a "memory" according to aspects of the present disclosure may include, but are not limited to, a buffer of the CPU 11, the ROM 12, the RAM 13, and the non-volatile memory 14. The scan application 41 may be an example of an "application realized by computer-readable instructions" according to aspects of the present disclosure. Further, the scan application 41 may be an example of "processor-executable instructions" according to aspects of the present disclosure. The user I/F 15 may be an example of a "display" according to aspects of the present disclosure. The network I/F 16 and the USB I/F 17 may be included in "one or more communication interfaces" according to aspects of the present disclosure. The controller 10 may be an example of a "controller" according to aspects of the present disclosure. The workflow generating instruction may be an example of a "workflow storing instruction" according to aspects of the present disclosure. The token(s) may be an example of "authentication information" according to aspects of the present disclosure. The authentication information table 82 may be an example of a "first table" according to aspects of the present disclosure. The specific token table 83 may be an example of a "second table" according to aspects of the present disclosure. The shared token table 91 may be an example of a "third table" according to aspects of the present disclosure.

What is claimed is:

1. An information processing device comprising:
one or more communication interfaces configured to communicate with an image processing apparatus and a cloud server; and
a controller configured to:
when receiving a workflow storing instruction to store a workflow, select one of a plurality of methods to obtain authentication information for accessing the cloud server set for the workflow to be stored, the plurality of methods including a first method in which the authentication information is obtained from a first table stored in a memory of the information processing device, the first table storing the authentication information in association with identification information of the cloud server, the workflow being a sequence of processes using the image processing apparatus and the cloud server; and
when receiving a workflow execution instruction to perform the workflow, access the cloud server by using the authentication information obtained in the selected method,
when the first method is not selected, obtain the authentication information from a source other than the first table, and register the obtained authentication information onto a second table in association with identification information of the workflow to be stored; and
in response to receiving the workflow execution instruction, perform:
when the first method is selected, reading out the authentication information associated with the identification information of the cloud server set for the workflow to be stored, from the first table, and accessing the cloud server by using the authentication information read out from the first table; and
when the first method is not selected, reading out the authentication information associated with the identification information of the workflow from the second table, and accessing the cloud server by using the authentication information read out from the second table.

2. The information processing device according to claim 1, wherein the controller comprises:
a processor; and
a memory storing processor-executable instructions configured to, when executed by the processor, cause the processor to:
when receiving the workflow storing instruction, select one of the plurality of methods to obtain the authentication information for accessing the cloud server set for the workflow to be stored; and
when receiving the workflow execution instruction, access the cloud server by using the authentication information obtained in the selected method.

3. A method implementable on a processor of an information processing device communicably connected with an image processing apparatus and a cloud server, the method comprising:
when receiving a workflow storing instruction to store a workflow, selecting one of a plurality of methods to obtain authentication information for accessing the cloud server set for the workflow to be stored, the plurality of methods include a first method in which the authentication information is obtained from a first table stored in a memory of the information processing device, the first table storing the authentication information in association with identification information of the cloud server, the workflow being a sequence of processes using the image processing apparatus and the cloud server; and when receiving a workflow execution instruction to perform the workflow, accessing the cloud server by using the authentication information in the selected method, when the first method is not selected, obtaining the authentication information from a source other than the first table, and registering the obtained authentication information onto a second table in association with identification information of the workflow to be stored; and in response to receiving the workflow execution instruction:
when the first method is selected, reading out the authentication information associated with the identification information of the cloud server set for the workflow to be stored, from the first table, and accessing the cloud server by using the authentication information read out from the first table; and
when the first method is not selected, reading out the authentication information associated with the identification information of the workflow from the second table, and accessing the cloud server by using the authentication information read out from the second table.

4. A non-transitory computer-readable medium storing computer-readable instructions executable by a processor of an information processing device communicably connected with an image processing apparatus and a cloud server, the instructions realizing an application configured to, when executed by the processor, cause the processor to:

when receiving a workflow storing instruction to store a workflow, select one of a plurality of methods to obtain authentication information for accessing the cloud server set for the workflow to be stored, the workflow being a sequence of processes using the image processing apparatus and the cloud server; and when receiving a workflow execution instruction to perform the workflow, access the cloud server by using the authentication information obtained in the selected method, wherein the plurality of methods include a first method in which the authentication information is obtained from a first table stored in a memory of the information processing device, the first table storing the authentication information in association with identification information of the cloud server, and wherein the application is further configured to, when executed by the processor, cause the processor to:
when the first method is not selected, obtain the authentication information from a source other than the first table, and register the obtained authentication information onto a second table in association with identification information of the workflow to be stored; and
in response to receiving the workflow execution instruction, perform:
when the first method is selected, reading out the authentication information associated with the identification information of the cloud server set for the workflow to be stored, from the first table, and accessing the cloud server by using the authentication information read out from the first table; and
when the first method is not selected, reading out the authentication information associated with the identification information of the workflow from the second table, and accessing the cloud server by using the authentication information read out from the second table.

5. The non-transitory computer-readable medium according to claim 4,
wherein the application is further configured to, when executed by the processor, cause the processor to:
when the first method is selected, perform:
reading out the authentication information associated with the identification information of the cloud server from the first table, and registering the read authentication information onto a second table in association with the identification information of the workflow to be stored; and
in response to receiving the workflow execution instruction, reading out the authentication information associated with the identification information of the workflow from the second table, and accessing the cloud server by using the authentication information read out from the second table.

6. The non-transitory computer-readable medium according to claim 4,
wherein the plurality of methods include a second method in which new authentication information is obtained from the cloud server, and
wherein the application is further configured to, when executed by the processor, cause the processor to:
when the second method is selected, receive information necessary for accessing the cloud server, access the cloud server by using the received information, obtain the new authentication information from the cloud server, and register the identification information of the workflow to be stored, onto the second table in association with the obtained new authentication information.

7. The non-transitory computer-readable medium according to claim 4,
wherein the second table is configured to store a plurality of workflows registered thereon,
wherein the plurality of methods include a second method in which when the second table stores identification information of another workflow using the same cloud server as set for the workflow to be stored, the processor reads out authentication information associated with the said another workflow from the second table, and
wherein the application is further configured to, when executed by the processor, cause the processor to:
when the second method is selected, if the second table stores the identification information of the said another workflow, read out the authentication information associated with the said another workflow from the second table, and register the identification information of the workflow to be stored, onto the second table in association with the read authentication information.

8. The non-transitory computer-readable medium according to claim 4,
wherein the second table is configured to store a plurality of workflows registered thereon,
wherein the plurality of methods include a second method in which the authentication information is obtained from the second table, and
wherein the application is further configured to, when executed by the processor, cause the processor to:
select the second method when the second table stores identification information of another workflow using the same cloud server as set for the workflow to be stored; and
select the first method when the second table does not store the identification information of the said another workflow using the same cloud server as set for the workflow to be stored.

9. The non-transitory computer-readable medium according to claim 8,
wherein the plurality of methods include a third method in which the processor receives information necessary for accessing the cloud server, accesses the cloud server by using the received information, and obtains new authentication information from the cloud server, and
wherein the application is further configured to, when executed by the processor, cause the processor to:
select the third method, when the second table does not store the identification information of the said another workflow using the same cloud server as set for the workflow to be stored, and the first table does not store the authentication information associated with the identification information of the cloud server set for the workflow to be stored.

10. The non-transitory computer-readable medium according to claim 4,
wherein the information processing device has computer-readable instructions incorporated therein realizing another application program, the instructions realizing the another application program being configured to, when executed by the processor, cause the processor to obtain the authentication information associated with the identification information of the cloud server from a third table stored in the memory of the information processing device, and access the cloud server by using the obtained authentication information,
wherein the plurality of methods include a second method in which the authentication information is obtained from the third table, and
wherein the application is further configured to, when executed by the processor, cause the processor to:
select the second method, when the second table does not store identification information of another workflow using the same cloud server as set for the workflow to be stored, and the third table stores the authentication information associated with the identification information of the cloud server set for the workflow to be stored.

11. The non-transitory computer-readable medium according to claim 4,
wherein the second table is configured to store a plurality of workflows registered thereon,
wherein the plurality of methods include a second method in which the authentication information is obtained from the second table, and
wherein the application is further configured to, when executed by the processor, cause the processor to:
when the second table stores identification information of another workflow using the same cloud server as set for the workflow to be stored, control a display of the information processing device to display a screen for receiving a selection as to whether to use authentication information associated with the identification information of the said another workflow, and
select the second method in response to receiving, via the screen, a selection of using the authentication information associated with the identification information of the said another workflow.

12. The non-transitory computer-readable medium according to claim 4,
wherein the application is further configured to, when executed by the processor, cause the processor to:
in response to receiving the workflow execution instruction, when determining that the first method is not selected, read out the authentication information from the second table;
when the authentication information read out from the second table has expired, receive information necessary for accessing the cloud server set for the workflow to be stored, access the cloud server by using the received information, and obtain new authentication information from the cloud server; and
update the authentication information registered on the second table by replacing the registered authentication information with the obtained new authentication information.

13. The non-transitory computer-readable medium according to claim 12,
wherein the second table is configured to store a plurality of workflows registered thereon, and
wherein the application is further configured to, when executed by the processor, cause the processor to:
when same authentication information as the expired authentication information is stored on the second table in association with identification information of another workflow, update the same authentication information as the expired authentication information by replacing the same authentication information as the expired authentication information with the obtained new authentication information.

14. The non-transitory computer-readable medium according to claim 4,
wherein the application is further configured to, when executed by the processor, cause the processor to:
control a display of the information processing device to display a screen for selecting one of the plurality of methods, and receive a selection from the plurality of methods via the screen.

* * * * *